United States Patent
Ferm et al.

(10) Patent No.: US 10,017,685 B2
(45) Date of Patent: Jul. 10, 2018

(54) CONTROLLED RELEASE GRANULE WITH WATER RESISTANT COATING

(71) Applicant: Akzo Nobel Chemicals International B.V., Arnhem (NL)

(72) Inventors: Paul Michael Ferm, Morristown, NJ (US); Andrew Alexander Robertson, Aberdeen, NJ (US); Kurt Randall Heidemann, Easton, PA (US); Jian Zhou, Langhorne, PA (US); Daniel Bode, Cleveland, OH (US); Jude Thomas Rademacher, Akron, OH (US); Patricia B. Siuta-Cruce, Scottsdale, AZ (US)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/327,486

(22) PCT Filed: Jul. 17, 2015

(86) PCT No.: PCT/EP2015/066390
§ 371 (c)(1),
(2) Date: Jan. 19, 2017

(87) PCT Pub. No.: WO2016/012358
PCT Pub. Date: Jan. 28, 2016

(65) Prior Publication Data
US 2017/0158950 A1     Jun. 8, 2017

Related U.S. Application Data

(60) Provisional application No. 62/026,864, filed on Jul. 21, 2014.

(30) Foreign Application Priority Data

Oct. 24, 2014   (EP) .................................... 14190201

(51) Int. Cl.
| | | |
|---|---|---|
| C09D 125/14 | (2006.01) |
| E21B 43/26 | (2006.01) |
| C09K 8/68 | (2006.01) |
| C09K 8/70 | (2006.01) |
| B01J 13/04 | (2006.01) |
| C09D 133/08 | (2006.01) |

(52) U.S. Cl.
CPC ................ *C09K 8/68* (2013.01); *B01J 13/04* (2013.01); *C09D 125/14* (2013.01); *C09D 133/08* (2013.01); *C09K 8/706* (2013.01); *E21B 43/26* (2013.01); *C08L 2312/00* (2013.01); *C09K 2208/26* (2013.01)

(58) Field of Classification Search
CPC .............. G03C 2200/36; C09D 133/08; C09K 2208/26; C09K 8/68; C09K 8/706; E21B 43/26
See application file for complete search history.

(56) References Cited

U.S. PATENT DOCUMENTS

| | | | |
|---|---|---|---|
| 2,010,358 A | 8/1935 | Groll et al. | |
| 4,741,401 A | 5/1988 | Walles et al. | |
| 5,186,732 A * | 2/1993 | Thompson | C05G 3/0029 427/213 |
| 6,080,802 A | 6/2000 | Emmons et al. | |
| 6,881,709 B2 | 4/2005 | Nelson et al. | |
| 7,084,095 B2 | 8/2006 | Lee et al. | |
| 2002/0004464 A1 | 1/2002 | Nelson et al. | |
| 2006/0035790 A1* | 2/2006 | Okell | C09K 8/805 507/269 |
| 2011/0288232 A1 | 11/2011 | Rademacher et al. | |
| 2013/0255951 A1 | 10/2013 | Little et al. | |

FOREIGN PATENT DOCUMENTS

| | | |
|---|---|---|
| EP | 0266175 A2 | 5/1988 |
| GB | 2332223 A | 6/1999 |
| WO | 2013/090341 A1 | 6/2013 |

OTHER PUBLICATIONS

European Search Report issued in EP Application No. 14190201.5 dated Apr. 28, 2015.
International Search Report and Written Opinion for PCT/EP2015/066390 dated Oct. 28, 2015.

\* cited by examiner

*Primary Examiner* — Zakiya W Bates
(74) *Attorney, Agent, or Firm* — Matthew J. DeRuyter

(57) ABSTRACT

A controlled release composition containing a water-active material in the form of granules having a protective barrier coating capable of releasing the water-active material under predetermined release conditions, wherein the protective barrier coating comprises a polymer blend of two latex polymers, a method of preparing such a composition, a sprayable solution useful in the preparation of the composition, and the use of the composition for breaking a fracturing fluid.

13 Claims, 1 Drawing Sheet

CONTROLLED RELEASE GRANULE WITH WATER RESISTANT COATING

This application is a national stage filing under 35 U.S.C. § 371 of PCT/EP2015/066390, filed Jul. 17, 2015, which claims priority to U.S. Provisional Patent Application No. 62/026,864 filed Jul. 24, 2014, and European Patent Application No. 14190201.5, filed Oct. 24, 2014, the contents of which are each incorporated herein by reference in their entireties.

FIELD OF THE INVENTION

The field of the invention relates to compositions and methods for controlling the release of active water-soluble materials in an aqueous environment, particularly liquids containing water, whereby the water can be dispersed in another phase, or wherein the water is the continuous phase. More particularly, it relates to an active water-soluble material in the form of a granule or particle and having a protective barrier coating capable of releasing the water-soluble material into an environment containing water.

BACKGROUND OF THE INVENTION

Encapsulation of an active material is generally known and many polymers have been referenced and used. A typical configuration for coating large granules is sometimes referred to as core-shell encapsulation. In core-shell encapsulation, water soluble actives are encapsulated in an insoluble (or very slowly soluble) plastic.

Poly(vinylidene dichloride) (PVDC) latex emulsions also known by the trademarked names Daran in emulsion form and Saran in solid film form, has been widely used in this regard and is a highly chlorinated plastic, which has environmental concerns. It would be beneficial if a more sustainable polymer can be used that meets the required performance criteria.

In addition, coating with PVDC can be overly time consuming and costly. The cleaning of process equipment is difficult due to its low solubility in all aqueous cleaning solutions and standard cleaning solvents, with the exception of tetrahydrofuran (THF). The polymer cures overly fast in typical coating equipment, requiring that a very low coating temperature be used to avoid premature latex curing and spray nozzle blockage. Therefore, a replacement polymer latex which facilitates faster coating speed is also desirable.

Other polymers suggested for such use include a range of different polyurethanes. These polymers are synthesized using isocyanates and therefore also have environmental concerns in their manufacture and use. Bisphenol A (BPA) epoxy resins have also been suggested for use as barrier coatings for use in a water containing environment, however such materials are under scrutiny for their content of BPA. US 2013/255951 discloses a single latex polymer with a single Tg value for use in a delayed release coating. WO 2013/090341 discloses coating and paint compositions of a single latex polymer, and the compositions show improved block resistance, scrub resistance, and tack resistance.

There exists a need to provide granules of a water-active material with a barrier coating that has good film formation in the process of encapsulating the active, that has good performance as a barrier under the required temperature and/or pressure in the aqueous environment, and that has good performance from an environmental and/or health safety standpoint with minimized extractable materials.

SUMMARY OF THE INVENTION

The present invention is directed to a controlled release composition comprising a water-active material in the form of granules having a protective barrier coating capable of releasing the water-active material. The present invention provides granules of a water-active material with a barrier coating that has good film formation in the process of encapsulating the active, that has good performance as a barrier under the required temperature and/or pressure in the aqueous environment and that has good performance from an environmental and health safety standpoint with minimized extractable materials.

In one aspect, the invention is directed to a controlled release composition comprising a water-active material in the form of granules having a protective barrier coating capable of releasing the water-active material, preferably under predetermined release conditions, wherein the protective barrier coating comprises a polymer blend of at least two latex polymers. In one embodiment, the blend comprises a high glass-transition-temperature (Tg) latex polymer and a low Tg latex polymer, wherein the ratio of high to low Tg latex polymer is in the range from 40:60 to 99:1. The values of Tg listed throughout this application refers to values measured in a differential scanning calorimeter (DSC) according to the method disclosed herein, unless otherwise noted.

In one embodiment, the high Tg polymer has a Tg of about 60° C. or higher and the low Tg polymer has a Tg of about 40° C. or lower. In embodiments, the high Tg polymer has a Tg of about 70° C. or higher, or about 80° C. or higher. In one embodiment, the high and low Tg latex polymers are different copolymers of polymers chosen from styrene, ethyl acrylate, methacrylic acid, and glycidyl acrylate. In one embodiment, the polymer blend is a blend of different styrene-acrylate copolymers.

In an embodiment, at least one latex polymer is substantially internally cross-linked, e.g., as measured by a gel content of greater than 30% by weight (wt %), as determined by measuring the percent of the material that does not dissolve in THF when treated at reflux temperature and atmospheric pressure for 1 hour.

In one embodiment, an amount of stabilizer (e.g., dodecylbenzene sulfonic acid), in an amount in the range of about 0.1 to about 10 wt % based on weight of polymer solids, is present during the polymerization reaction to minimize the amount of extractable material.

In one aspect, the invention is directed to a sprayable formulation for creating a controlled release barrier coating on a water-active granular material, the formulation comprising water and a polymer blend of at least two latex polymers. In one embodiment, the latex polymers include at least one high Tg latex polymer and at least one low Tg latex polymer, wherein the ratio of high to low Tg latex polymer in the sprayable formulation is in the range from 40:60 to 99:1, preferably about 60:40 to about 73:27. In one embodiment, the ratio of high:low Tg polymer is about 67:33. In one embodiment, the sprayable formulation is adjusted to have a polymer solids content in the range of about 10 to about 40 wt %. In one embodiment, the polymer solids content is in the range of about 18 to about 20 wt %.

In an embodiment of the invention, the sprayable formulation contains an organic solvent with a boiling point in the range from about 110° C. to about 225° C. and the weight ratio of solvent to polymer solids is in the range from about 0.5:1 to about 0.1:1. In an embodiment of the invention, the sprayable formulation further comprises additional base, e.g., ammonium hydroxide, in an amount sufficient to prevent premature precipitation of the polymer solids in the formulation.

In one aspect, the invention is directed to a method of coating a water-active material in the form of granules with a sprayable formulation of a protective barrier coating in a particle coating apparatus, wherein the spray formulation can be as described above. The method comprises: (1) introducing the water-active material in the form of granules into the particle coating apparatus; (2) introducing the sprayable formulation into the particle coating apparatus and maintaining conditions sufficient for a barrier coating to build up on the water-active material and form coated particles, and to remove water from the apparatus until the coated particles contain a predetermined amount of barrier coating and the barrier coating is substantially free of water; and (3) subjecting the coated particles to conditions sufficient to anneal the barrier coating and substantially remove any organic solvent from the barrier coating. In one embodiment, step (2) is carried out at a temperature below 50° C. In one embodiment, step (3) is carried out at a temperature at or above 100° C.

In embodiments of the invention, the final coated particle or granule has a predetermined amount of coating and water-active material to achieve a predetermined release condition. In one embodiment, the predetermined release conditions are chosen from a predetermined exposure to an aqueous environment that results in swelling by water leading to rupture and release of active (a type of osmotic rupturing) or subjecting the controlled release composition to high shear crush forces sufficient to rupture the barrier coating. The amount of polymer coating to achieve the predetermined release conditions is determined by the behavior of the particular coating in the environment that it will be used in and is a function of exposure time and temperature, or, if applicable, the pressure required to crush the coated granule to release the active. In one embodiment, the polymer coating is present in an amount from about 20 to about 40 wt %, preferably about 30 wt %, based on the total weight of the coated granule.

In one embodiment, the water-active material is a solid oxidizer, e.g., capable of oxidizing chemical bonds of materials employed in a subterranean formation. In one embodiment, the oxidizer is a breaker useful for breaking an aqueous fracturing fluid treating a subterranean formation. In such an embodiment, the barrier coating is capable of releasing the breaker as a result of a predetermined exposure to the aqueous fracturing fluid or as a result of subjecting the controlled release composition to high shear crush forces sufficient to rupture the barrier coating.

In another aspect, the invention is directed to a method for breaking an aqueous fracturing fluid, the method comprising introducing into a subterranean formation a controlled release breaker composition comprising a breaker for the aqueous fracturing fluid in the form of breaker granules having a protective barrier coating capable of releasing the breaker under predetermined release conditions, wherein the protective barrier coating comprises a polymer blend of two latex polymers. In one embodiment, the blend comprises about 60 to about 80 wt % high Tg latex polymer and about 20 to about 40 wt % low Tg latex polymer, wherein the high Tg latex polymer has a Tg at least about 40° C. higher than the Tg of the low Tg latex polymer, and wherein the predetermined release conditions are chosen from a predetermined exposure to the fracturing fluid that results in osmotic rupturing or subjecting said controlled release breaker composition to high shear crush forces sufficient to rupture said barrier coating.

Additional objects, advantages and novel features will be apparent to those skilled in the art upon examination of the description that follows.

DETAILED DESCRIPTION OF THE INVENTION

Figure 1:
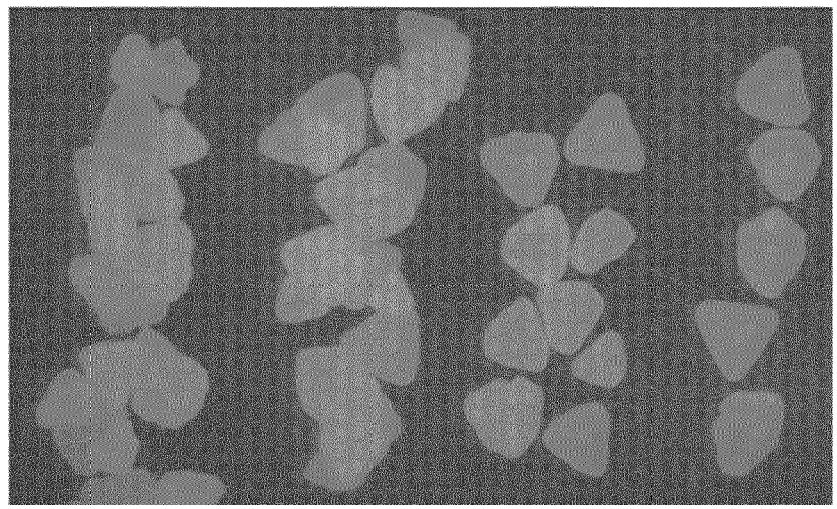
FIG. 1 is a photomicrograph showing coated particles from Examples 28, 29, 24, and 32.

The present invention is directed to a controlled release composition comprising a water-active material in the form of granules having a protective barrier coating capable of releasing the water-active material under predetermined release conditions, wherein the protective barrier coating comprises a polymer blend of two latex polymers. The present invention provides granules of a water-active material with a barrier coating that has good film formation in the process of encapsulating the active, that has good performance as a barrier under the required temperature and/or pressure in the aqueous environment and that has good performance from an environmental and health safety standpoint with minimized extractable materials.

In one aspect, the invention is directed to a controlled release composition comprising a water-active material in the form of granules having a protective barrier coating capable of releasing the water-active material under predetermined release conditions, wherein the protective barrier coating comprises a polymer blend of two latex polymers comprising a high glass-transition-temperature (Tg) latex polymer and a low Tg latex polymer.

The Tg is a defined parameter to describe a temperature region over which the heat capacity, as indicated by heat flow, suddenly increases due to the increased long-range cooperative motion of polymer chain segments. The transition is characterized as the peak of the rate of change of heat capacity as a function of temperature. In other words, the heat capacity increases over a temperature range from one level to another and the rate of fastest increase of heat capacity is defined as the Tg. The glass transition signal is a reversible transition of the amorphous polymer regions which can be more clearly observed by modulating the temperature ramp with a small additional temperature variation in the form of a sine wave. Non-immediately reversible transitions such as crystal melting can thereby be effectively separated from the reversible Tg transition. For the instant invention, the Tg of the different latex polymers and of the dried sprayable coatings containing blends of latex polymers and organic solvents were measured via modulated differential scanning calorimetry (MDSC). A DSC such as the Model Q200 Modulated DSC available from TA Instruments, New Castle, Del., USA is capable of carrying out MDSC measurements. A small sample in the range of 0.5 to 5 mg is placed and carefully dried in a DSC pan and sealed. The polymer containing sample is then monitored against a blank control pan and the relative heat flow is measured as a function of temperature and time during which a temperature ramp is applied. For this invention, the Tg was measured by first cooling the sample to −40° C., then heating with a temperature ramp of 3° C./min superimposed with an additional sine oscillating temperature signal of +/−1° C. and a period of 1 minute.

In embodiments of the invention, the blend of latex polymers having different Tg's results in a particle coating with minimal tackiness and good barrier properties against the ingress of water, as well as preventing the egress of the small molecule active which is encapsulated therein. By "high Tg" is meant a Tg which is significantly higher, e.g., at least 5° C., 10° C., or 20° C. higher, than the ambient handling temperature of the finished particles, e.g., typical environmental conditions, such as outdoor temperatures of −20° C. to 40° C., and above the temperature of the environment to which the controlled release granule will be exposed while it is in use. For instance, in oilfield applications, the temperature may rise to subterranean temperatures of 60° C., 80° C., or above. When selecting a high Tg polymer for the encapsulation blend, it is desired to have good performance at the highest working temperature. Thus, depending on the intended application, the high Tg polymer can have a Tg of about 60° C. or higher, or about 70° C. or higher, or about 80° C. or higher, or about 90° C. or higher. In one embodiment of the invention, the high Tg polymer has a DSC-measured Tg in the absence of solvent, particularly a coalescence solvent, of about 89 to 91° C.

By "low Tg" is meant a glass transition temperature close to the ambient handling temperature of the finished particles, e.g., in the range of typical environmental conditions, such as outdoor temperatures of −20° C. to 40° C. In one embodiment of the invention, the low Tg polymer has a DSC-measured Tg in the absence of coalescence solvent of about 28 to 30° C.

Not to be bound by theory, it is believed that exposing a particular polymer to temperatures above the polymer Tg, the molecular motion of the polymer becomes greater which can lead to higher permeation of water and of actives leading to poor encapsulation. It is believed that when a single high Tg polymer is used, the brittle nature of the high Tg polymer leads to brittleness and coating fractures, resulting in higher permeation of water and actives and an insufficient protective coating. To the contrary, when a single low Tg polymer is used, the very pliable nature of the low Tg polymer leads to inadequate particle formation, where the particles are heavily clustered to the point of being a solid mass of material, resulting in inadequate protection and release characteristics or simply does not provide a granule form.

In one aspect, the invention is directed to a controlled release composition, wherein the protective barrier coating comprises a polymer blend of two different latex polymers comprising a high glass-transition-temperate (Tg) latex polymer and a low Tg latex polymer.

In embodiments, the high Tg polymer has a Tg in the range of about 50° C. to about 100° C., preferably about 70° C. to about 100° C., more preferably in the range of about 78° C. to about 90° C., and the low Tg polymer has a Tg of about 40° C. or lower, preferably in the range of about 0° C. to about 40° C., more preferably in the range of about 15° C. to about 25° C. In embodiments, the Tg of the high Tg latex polymer is higher that the Tg of the low Tg latex polymer by an amount of about 20° C. or more, about 30° C. or more, about 35° C. or more, or about 40° C. or more.

In one aspect, the high and low Tg latex polymers can each be polymerized from a blend of ethylenically unsaturated monomers. In embodiments of the invention, the high and low Tg latex polymers can be different (co)polymers based on (or derived from) monomers of a type, or having a structural group, chosen from vinyl, styrene, acrylate, methacrylate, acrylic acid, methacrylic acid or combinations thereof. In one embodiment, the high and low Tg latex polymers are different copolymers based on a monomer chosen from styrene, acrylates, acrylic acids, epoxy acrylates, or combinations thereof. In one embodiment, the different copolymers are each synthesized from a monomer chosen from styrene, ethyl acrylate, methacrylic acid, glycidyl methacrylate, and combinations thereof. In another embodiment, the high and low Tg latex polymers can be different copolymers based on a monomer chosen from of ethylhexyl methacrylate, styrene, butyl acrylate, hydroxypropyl methacrylate, glycerol dimethacrylate, and combinations thereof. The determination of high and low Tg values can be carefully controlled by holding the combination of monomer types constant but varying the relative addition levels of each monomer. The Fox equation can be used to calculate the approximate Tg, but in the case of this invention, where cross-linker monomers are included, the Fox equation results are typically substantially lower than the actual, measured Tg values.

In an embodiment of the invention, at least one of the latex polymers is internally (or intrinsically) cross-linked as measured by a gel content of about 30% or greater. In embodiments of the invention, at least one latex polymer has a gel content greater than 30%, or greater than 40%, or greater than 50%, or greater than 70%, or greater than 80%. In embodiments of the invention, each of the latex polymers are substantially internally cross-linked as measured by high gel content of greater than 40%, or greater than 50%, or greater than 60%, or greater than 70%. In another embodiment, both latex polymers are substantially internally cross-linked as measured by high gel content of greater than 80%. Not to be bound by theory, it is believed that the degree of gel content affects the ability for the latex polymer particles to partially interpenetrate in order to create a non-porous film. Thus, the high degree of cross-linking allows latex particles to film form but inhibits the full dissolution and mixing of the high and low Tg co-polymers even in the presence of organic solvent. In one embodiment, the cross-linkable monomers are glycidyl methacrylate and methacrylic acid. In another embodiment, the cross-linkable monomers are hydroxypropyl methacrylate and glycerol dimethacrylate.

In one aspect, the invention involves minimizing the leachable additives in all aspects of the coated polymer film. Colloidal stabilizers typically used in emulsion polymerization processes are an example of leachable material and, as such, it is desirable to minimize these materials in the latex polymer. In one embodiment, a standard colloidal stabilizer level used in latex polymerization of, e.g., 1 to 3 wt % of sodium lauryl sulfate, is not desired and is thus not used.

In embodiments of the invention, stabilizers are used that do not result in being a significant leachable additive in the final coated granule. In embodiments of the invention, such stabilizers are chosen from alkyl aryl surfactants, preferably having strongly acid head groups, or other strong acid stabilizers. By "strong acid" is meant that it completely dissociates in water without ionization. Examples of strong acid stabilizers are dodecylbenzene sulfonic acid, dinonylnaphthalene sulfonic acid, dinonylnaphthylenedisulfonic acid, bis(2-ethylhexyl)sulfosuccinic acid, and combinations thereof. In embodiments of the invention, the stabilizer is present in an amount from about 0.1 to about 10 wt %, or about 0.1 to about 5 wt %, or about 0.1 to about 1 wt %, or about 0.1 to about 0.5 wt %, based on the polymer solids content. In one embodiment, an intentionally minimal amount of stabilizer, in the range of about 0.1 wt % to about 0.5 wt %, e.g., dodecylbenzene sulfonic acid, is used during the polymerization reaction which has been found to allow for successful latex polymerization and to also minimize the amount of extractable material in the final polymer coating. In embodiments of the invention, the stabilizer is chosen from dodecylbenzene sulfonic acid, dinonylnaphthalene sulfonic acid, dinonylnaphthylenedisulfonic acid, bis(2-ethylhexyl)sulfosuccinic acid, and combinations thereof.

In another aspect, the invention involves compositions substantially free from a wax component. Substantially free means that the compositions contains less than 15 wt % of wax components, preferably less than 5 wt %, 1 wt %, 0.5 wt %, 0.25 wt %, 0.1 wt % or 0.01 wt %. In yet another embodiment, the compositions of the invention are free from wax components.

In one aspect, the invention is directed to a controlled release composition comprising a water-active material in the form of granules having a protective barrier coating capable of releasing the water-active material under predetermined release conditions, wherein the protective barrier coating comprises a polymer blend of two latex polymers, wherein the blend contains the high and low Tg latex polymers described above. In one embodiment, the final coating has a ratio of High Tg polymer to Low Tg polymer based on the solids weight of the polymers (High to Low ratio), in the range from about 40:60 to about 99:1. In a preferred embodiment the High to Low ratio is in the range of about 50:50 to about 80:20. In a more preferred embodiment, the High to Low ratio is in the range of about 60:40 to about 73:27, with the most preferred High to Low ratio being about 67:33. It has been found that selection of the High to Low ratio as described above results in good formation of individual coated particles and minimizes the amount of release of the active material. In embodiments of the invention, the coated particles include a final barrier coating having two distinct Tg's. This can be determined by MDSC as described above. Not to be bound by theory, it is believed that the amount of cross-linking within the latex polymer, the amount and type of organic solvent to achieve coalescence, and appropriate annealing conditions have an effect on the final desired properties of the controlled release composition.

In one aspect, the invention is directed to a sprayable formulation for creating a controlled release barrier coating on a water-active granular material, the formulation comprising a polymer blend of the high and low Tg latex polymers as described above. In one aspect, it is believed that the total amount of polymer solids in the sprayable formulation has an effect on ability to successfully coat the active granule. In one embodiment, the sprayable formulation has a polymer solids content in the range from about 10% to about 40%, based on the total weight of the sprayable formulation. In one embodiment of the invention, the sprayable formulation contains about 18% to about 20% polymer solids. In an embodiment, the sprayable formulation further comprises an amount of a base, e.g., ammonium hydroxide, sufficient to prevent premature precipitation of the polymer solids in the formulation upon dilution.

In one aspect, the sprayable formulation contains an organic solvent with a boiling point above that of water. It is believed the organic solvent has a varying degree of solubility with respect to the high and low Tg latex polymer particles and aids in the formation of a non-porous uniform film during the coating and annealing process. In one aspect, use of the higher boiling point solvent allows for the removal of water from the film during coating before the removal of the solvent. In one embodiment, the boiling point of the organic solvent is in the range of about 110° C. to about 225° C. In another embodiment, the boiling point is in the range from about 160 to about 210° C. In embodiments of the invention, the solvent is chosen from 2-butoxyethanol having a boiling point of about 171° C., 1-methyl-2-pyrrolidone (NMP) having a boiling point of about 203° C., 1-methoxy-2-propanol having a boiling point of about 119° C., or a combination of these.

In one aspect, the sprayable formulation contains a defined ratio of organic solvent to polymer solids. In one embodiment, the ratio of organic solvent to polymer solids is in the range of about 0.46:1 to about 0.0:1, based on weight. A preferred range of the ratio of organic solvent to polymer solids is in the range of about 0.3:1 to about 0.07:1, based on weight. A more preferred range of the ratio of organic solvent to polymer solids is in the range of about 0.13:1 to about 0.1:1. It is believed, the added solvent ensures the formation of a non-porous uniform film during the coating and annealing process by temporarily lowering the Tg of the respective latex polymers, allowing for greater mobility and penetration of the polymer latex particles. It has been found that too much solvent, however, leads to excessive particle cluster formation and is not suitable where smaller individual particles are desirable.

In one aspect, the invention is directed to a method of coating a water-active material in the form of granules with a sprayable formulation of a protective barrier coating in a particle coating apparatus, wherein the spray formulation can be as described above. The method comprises: (1) introducing the water-active material in the form of granules into the particle coating apparatus; (2) introducing the sprayable formulation into the particle coating apparatus and maintaining conditions (including a temperature below 50° C.) sufficient for a barrier coating to build up on the water-active material and form coated particles, and to remove water from the apparatus until the coated particles contain a predetermined amount of barrier coating and the barrier coating is substantially free of water; and (3) subjecting the coated particles to conditions (including a temperature above 100° C.) sufficient to anneal the barrier coating and substantially remove the organic solvent from the barrier coating.

Particle coating apparati known to those skilled in art can be used to coat such particles, including fluid bed coaters, such as the Glatt GPCG-1 fluid bed coater equipped with a Wurster column and 0.5 mm nozzle with external mix air atomization, as made by Glatt Air Techniques Inc., Ramsey, N.J., USA. Other coating apparati such as pan coaters, drum coaters, and modified spray dryers can also be used to gradually build up a coating for controlled release of active. Any desired water-active granule or crystal compatible with the coating materials and conditions describe above are contemplated for use in connection with the present invention. In one embodiment, the water-active crystal is anhydrous crystalline sodium chlorate (from AkzoNobel Pulp and Performance Chemicals, Marietta, Ga., USA) and sieved to have a particle size in the range from about 425 microns to about 850 microns. In one embodiment of the invention, the coating process is carried out by first establishing a fluidized bed of particles of the crystalline material. After establishing a fluidized bed of particles, temperatures are maintained in order to efficiently spray coat the crystals while removing predominantly water from the sprayable formulation via evaporation, and while allowing substantial retention of the organic solvent. After the coating is applied to the desired polymer solid weight basis, the sprayable formulation feed is stopped and an annealing process of final drying and solvent removal is achieved by maintaining air flow and increasing the flowing air temperature to a final temperature sufficient to remove substantially all remaining organic solvent. In embodiments of the invention, a flow-aid can be used to minimize agglomeration of the coated particles which are especially susceptible to cluster formation while they still have a substantial amount of residual organic solvent. Materials that aide in assuring free flowing granules typically are fine powders (flow-aids). Flow-aids known to those skilled in the art can be used, including fumed silica, finely milled minerals including talc and zeolite, starches, micronized calcium carbonate, and other similar materials. The final coated controlled release granules can be then be reduced back to lower temperatures and stored for later use.

Figure 2:
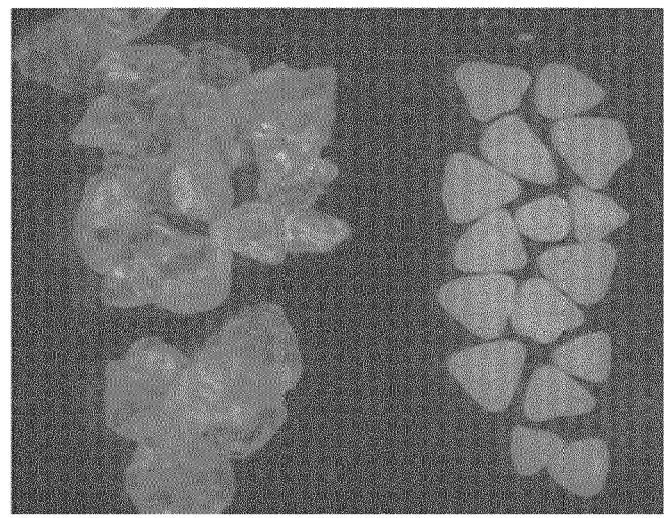
FIG. 2 is a photomicrograph showing coated particles from Examples 34 and 35.

In embodiments of the invention, the final coated particle or granule has a selected amount of barrier coating and of water-active material. In one embodiment, the polymer coating is present in an amount in the range from about 10 to about 40 wt %, preferably about 10 to about 30 wt %, based on the total weight of the coated granule. In embodiments of the invention, the polymer coating is present in an amount of about 30 wt %, or about 20 wt %, or about 10 wt %. The final particle size is determined by the specific end-use application. As demonstrated by the Examples (below), although in many applications, individually coated particles with good barrier properties represent the preferred morphology, agglomerated particles may also provide good barrier properties and, if desired, can be prepared by appropriate selection of organic solvent to polymer ratio and polymer type. Herein, particles are described as Individual, Clustered, and Heavily Clustered. Starting with particles having a size in the range of about 425 microns to 850 microns in cross-section, as obtained by the natural size of the water-active material itself or by additional sieving and sizing, the final particles that are categorized as Individual typically also pass through sieves in the range from 425 to 1700 microns in size, or from 425 to 850 microns in size. For example, in one embodiment, a spherical particle of sodium chlorate, with a specific gravity of about 2.5 g/ml and a diameter 850 microns, when coated with a shell of the polymer of specific gravity 1.2 g/ml and a coat weight of about 30%, will have a final total diameter of about 1050 microns (as determined by calculation method). Thus, for such sodium chlorate particles, the final coated particles which are truly individualized will have a final size distribution from about 450 microns to about 1050 microns. Practically, some particle doublets and triplets may occur and be acceptable, such that herein, Individual particles are typically accepted to be any particles which pass cleanly after coating through sieves from about 425 to about 1400 microns, or possibly up to about 1700 microns in size, depending on the application. Clustered and Heavily Clustered particles described herein are substantially larger due to heavy agglomeration and were found to be larger than about 1400 microns, or about 1700 microns in size, by sieve analysis and microscopy. See, e.g., FIGS. 1 and 2, showing some examples of Clustered particles as Examples 28, 29, 34 and some examples of Individual Particles as Examples 24, 32, and 35.

The predetermined release conditions are chosen from exposure to an aqueous environment that results in swelling by water leading to rupture and release of active (also called osmotic rupturing) or subjecting the controlled release composition to high shear crush forces sufficient to rupture the barrier coating. In order to characterize and tune to different osmotic rupturing conditions, various examples of controlled release granules were allowed to soak in water at various temperatures for different periods of time. For instance, to detect released sodium chlorate, various detection methods can be used to accurately measure active which leaks out of the controlled release granules. These techniques include inductively coupled plasma atomic emission spectroscopy (ICP-AES) to measure chlorine content, ion chromatography (IC) to accurately measure chlorate content, electrical conductivity (EC) to measure total conductive ion in solution content, and thermal gravimetric analysis (TGA) to measure total solids in solution content. These detection methods can be adjustment for a variety of actives. In particular, IC using a Dionex DX-500 meter was assessed to provide very precise and specific results for the measurement of the type and quantity of released ions in aqueous solution. A fixed weight of a controlled release granule is placed in deionized water and allowed to soak at various temperatures for different periods of time and the release of the desired active is measured and compared to control samples to arrive at the desired release rate for any desired application. For systematic comparison, the release content is preferably expressed in terms of the normalized percent release at a desired temperature and time. For example, the percent release can be determined after soaking in water at 70° C. for 1 hour. In embodiments of the invention, coated particles having an acceptable barrier coating will have a release of less than about 10% in 1 hour at 70° C., preferably less than about 2.5% in 1 hour at 70° C., more preferably, less than about 0.25% in 1 hour at 70° C. Continued accelerated release of active by an osmotic rupturing mechanism can continue with prolonged immersion in water. Alternatively, complete release of active can be achieved at any point with the addition of high shear crush forces sufficient to rupture the barrier coating. Alternatively, release may be desired at lower temperatures or longer times depending on the end-use application. In embodiments of the invention, release times at lower temperature conditions, for instance from about 0° C. to about 40° C., will generally be much greater than 1 hour and extending up to several months.

The water-active material can be selected from a wide variety of different compounds. In embodiments of the invention, the active material can include any of a number of materials that are useful in subterranean formations to reduce viscosity of a high viscosity or gel system. For example, viscoelastic surfactant systems are used in oilfield applications where the viscoelastic surfactant fluids achieve viscosity by forming micelles in the presence of an electrolyte. However, these high viscosity systems can interfere with fluid flow after the treatment (at high viscosity) is performed. Accordingly, it is necessary to reduce the viscosity of the system to effectuate cleanup of the reservoir, fracture, or other treated area by introducing or permitting materials to interact with the system that reduce the viscosity. Such materials include breakers or gel breakers. In embodiments of the invention, breakers can include oxidizers or enzymes that can reduce the viscosity of the system. In other embodiments, the active can be a salt that is sufficiently soluble in the treatment fluid that would disrupt the micelle structure and reduce the viscosity, e.g., by changing the electrolyte concentration, such as ammonium persulfate. In embodiments of the invention, the active can be selected from organic salts such as sodium salicylate, inorganic salts such as $NaPF_6$ (sodium hexafluorophosphate) and KCl (potassium chloride), and hydrocarbons or surfactants such as sodium dodecylsulfate. In one embodiment, the active can be a surfactant having hydrophilic head groups oppositely charged to the hydrophilic head groups of the surfactants that make up the viscoelastic surfactant fluid.

In one aspect, the water-active material is a solid oxidizer capable of oxidizing chemical bonds of materials found in a subterranean formation. This can include an oxidizer acting as a breaker material useful for breaking an aqueous fracturing fluid treating a subterranean formation. In such an embodiment, the barrier coating is capable of releasing the breaker as a result of a predetermined exposure to the aqueous fracturing fluid or as a result of subjecting the controlled release composition to high shear crush forces sufficient to rupture the barrier coating. In one embodiment, the oxidizer may be used to interact with other biological compounds in anaerobic conditions. In embodiments of the invention, the solid oxidizer can include chlorite, chlorate, perchlorate, and other analogous halogen compounds, in particular as the sodium salts thereof. In other embodiments, the solid oxidizer can include persulfate compounds, such as ammonium persulfate. In one embodiment, the water-active material is a surfactant or polymer capable of acting as an inhibitor to different chemically-mediated processes. In embodiments of the invention, the chemical processes which can be treated or inhibited with an active compound include acidic corrosion of iron and steel, scale formation by crystallization of inorganic materials, and viscosification via the formation of rod-like micelles.

In one embodiment, the water-active material is an agricultural active material, where the barrier coating is capable of releasing the agricultural active as a result of a predetermined exposure to the aqueous agricultural formulation and/or environmental moisture and conditions. In embodiments of the invention, the agricultural active is chosen from fertilizer, polymers for water retention, herbicides, pesticides and mixtures thereof. In these cases, the predetermined release condition may be at temperatures selected from varying temperatures typically encountered in an agricultural setting, e.g., a temperature in the range of about 0° C. to about 40° C. and in the presence of intermittent dry and wet conditions.

In another aspect, the invention is directed to a method for breaking an aqueous fracturing fluid, the method comprising introducing into a subterranean formation a controlled release breaker composition comprising a breaker for the aqueous fracturing fluid in the form of breaker granules having a protective barrier coating capable of releasing the breaker under predetermined release conditions. In one embodiment of the invention, the protective barrier coating comprises a polymer blend of two latex polymers, the blend comprising about 60 to about 73 wt % high Tg latex polymer and about 27 to about 40 wt % low Tg latex polymer, wherein the high Tg latex polymer has a Tg at least about 40° C. higher than the Tg of the low Tg latex polymer, and wherein the predetermined release conditions are chosen from a predetermined exposure to the fracturing fluid that results in osmotic rupturing or subjecting the controlled release breaker composition to high shear crush forces sufficient to rupture the barrier coating.

The following examples are presented to illustrate the invention and should not be construed to limit its scope. All percentages and parts are by weight unless otherwise indicated.

Example 1

A High Tg polymer latex emulsion, was made as follows: To 932.6 g demineralized water in a reactor was added a mixture of 3.2 g of 70% dodecylbenzene sulfonic acid in isopropyl alcohol (iPrOH), 14.9 g demineralized water and 0.44 g of 28% ammonia. The material was heated to 80° C. under a nitrogen sparge. When temperature was reached, the sparge was replaced with a nitrogen blanket. In a separate container, a pre-emulsion consisting of 638.5 g demineralized water, 6.4 g of 70% dodecylbenzene sulfonic acid, 0.89 g of 28% ammonia, 840.0 g styrene, 433.9 g ethyl acrylate, 71.4 g glycidyl methacrylate and 139.6 g methacrylic acid was prepared. 106.5 g of the pre-emulsion was added to the reactor and mixed for 15 min. Then, a mixture of 57.1 g demineralized water and 7.4 g ammonium persulfate was added and held for 15 min. Following the hold, the remainder of the pre-emulsion was fed in over 180 min. Upon completion of the feed, a mixture of 118.8 g demineralized water, 1.5 g ascorbic acid and 0.001 g iron (II) sulfate was added, followed by a mixture of 14.9 g demineralized water and 3.7 g t-butyl perbenzoate. The reaction was held for 15 min and then cooled to obtain white latex having 45% solids. A small amount of the final latex was thoroughly dried (variously at 130° C. and 170° C.) into thin films in the bottom of aluminum Tzero DSC pans for evaluation in a Q200 modulated DSC (TA Instruments, Wilmington, Del.). After sealing, the reversible heat flow was then measured by the modulated DSC method using a 3° C./min ramp with +/−1° C. with a 1 min period modulation which demonstrated a measured Tg in the range of 89 to 91° C. for Example 1.

Example 2

A Low Tg polymer latex emulsion, was made as follows: To 932.6 g demineralized water in a reactor was added a mixture of 3.2 g of 70% dodecylbenzene sulfonic acid in iPrOH, 14.9 g demineralized water and 0.44 g 28% ammonia. The material was heated to 80° C. under a nitrogen sparge. When temperature was reached, the sparge was replaced with a nitrogen blanket. In a separate container a pre-emulsion consisting of 638.5 g demineralized water, 6.4 g of 70% dodecylbenzene sulfonic acid, 0.89 g of 28% ammonia, 157.6 g styrene, 1116.4 g ethyl acrylate, 71.4 g glycidyl methacrylate and 139.6 g methacrylic acid was prepared. 106.5 g of the pre-emulsion was added to the reactor and mixed for 15 min. Then, a mixture of 57.1 g demineralized water and 7.4 g ammonium persulfate was added and held for 15 min. Following the hold, the remainder of the pre-emulsion was fed in over 180 min. Upon completion of the feed, a mixture of 118.8 g demineralized water, 1.5 g ascorbic acid and 0.001 g iron (II) sulfate was added, followed by a mixture of 14.9 g demineralized water and 3.7 g t-butyl perbenzoate. The reaction was held for 15 min and then cooled to obtain white latex having 45% solids. A small amount of the final latex was thoroughly dried (variously at 130° C. and 170° C.) into thin films in the bottom of aluminum Tzero DSC pans for evaluation in a Q200 modulated DSC (TA Instruments, Wilmington, Del.). After sealing, the reversible heat flow was then measured by modulated DSC giving a measured Tg in the range of 28 to 30° C. for Example 2.

Example 3—Comparative Example

As a comparative example, a polymer latex emulsion was prepared in a single pot, using the same monomers as Examples 1 and 2, however, with each monomer used at levels corresponding to an average composition of Examples 1 and 2 when formulated as a blend at a High to Low Tg ratio of 67:33 (the blend referred to as Example 4 in Table 1 below). The single pot emulsion was prepared as follows: To 932.6 g demineralized water in a reactor was added a mixture of 3.2 g of 70% dodecylbenzene sulfonic acid in iPrOH, 14.9 g demineralized water and 0.44 g of 28% ammonia. The material was heated to 80° C. under a nitrogen sparge. When temperature was reached, the sparge was replaced with a nitrogen blanket. In a separate container a pre-emulsion consisting of 638.5 g demineralized water, 6.4 g of 70% dodecylbenzene sulfonic acid, 0.89 g of 28% ammonia, 612.6 g styrene, 661.4 g ethyl acrylate, 71.4 g glycidyl methacrylate and 139.6 g methacrylic acid was prepared. 106.5 g of the pre-emulsion was added to the reactor and mixed for 15 min. Then a mixture of 57.1 g demineralized water and 7.4 g ammonium persulfate was added and held for 15 min. Following the hold, the remainder of the pre-emulsion was fed in over 180 min. Upon completion of the feed, a mixture of 118.8 g demineralized water, 1.5 g ascorbic acid and 0.001 g iron (II) sulfate was added, followed by a mixture of 14.9 g demineralized water and 3.7 g t-butyl perbenzoate. The reaction was held for 15 min and then cooled to obtain a white latex having 45% solids. A small amount of the final latex was thoroughly dried (variously at 130° C. and 170° C.) into thin films in the bottom of aluminum Tzero DSC pans for evaluation in a Q200 modulated DSC (TA Instruments, Wilmington, Del.). After sealing, the reversible heat flow was then measured by modulated DSC resulting in a Tg in the range of 66 to 69° C. for Example 3.

Examples 4-16

Sprayable coating formulations were made using the latex emulsions according to Examples 1 and 2, but adjusted to provide 20 weight percent polymer latex solids. Several variations were made by first varying the solvent level in the formulation, from 0% to 9.1%, and then by varying the relative ratio of High to Low Tg polymer in the formulation from 50:50 to 100:0. Sprayable formulations containing 250 g solid weight polymer were made in a 2,000-mL plastic beaker with a flat paddle mixer and a Model RZR 2041 Overhead Lab Mixer (Heidolph). In each EXAMPLE, 4 through 16, a ratio of High to Low Tg polymer was selected.

For EXAMPLE 4, a 67:33 ratio of High to Low Tg and a 2-butoxyethanol level of 9.1% were chosen and the corresponding sprayable coating formulation was made as follows: Polymer latex emulsion from EXAMPLE 1, with a 45% solids content, was weighed into the aforementioned plastic beaker to a weight of 372.2 g on a laboratory balance (Mettler Toledo model XS6001S). The beaker was then placed under the mixer, with the blade in the polymer solution, and set to mix at 150 rpm. Into a 1,000-mL plastic beaker, 183.3 g of latex emulsion from EXAMPLE 2 (45% solids content) was weighed using the same Mettler Toledo XS6001S Lab Scale. The Low Tg Latex Polymer, of EXAMPLE 2, was then slowly added to the mixing solution of EXAMPLE 1 and allowed to mix for 3 minutes. While the solutions were mixing, two aliquots of trim water required for a dilution to 20% final solids were weighed into separate 500-mL plastic beakers; the required mass of water, 572.4 g, was split evenly between the two beakers. After being allowed to mix, one water aliquot was added to the mixing polymer solutions and allowed to mix for 2 minutes. While mixing, a Thermo Scientific Orion 5 Star Lab Meter with a Thermo Scientific Orion 9165 SureFlo pH probe and Thermo Scientific Orion 928007MD temperature probe was set up adjacent to the mixer set up. Prior to being used, the pH probe was calibrated using pH 4, 7, and 10 buffers from Fisher Scientific (SB101, SB107, and SB115 respectively). Once calibrated, the probes were then immersed in the mixing solution with care being taken to avoid any contact with the mixing blade. After the pH reading had stabilized, 7 g of a saturated solution of ammonium hydroxide (28 wt %, Sigma-Aldrich 320145) was then slowly added to the solution until a stable pH reading of 8 was reached. A 115-g quantity of 2-butoxy ethanol (Sigma-Aldrich 537551) solvent was weighed into a 250-mL glass beaker. The solvent was slowly added to the mixture. This provided for a solvent to polymer ratio of 0.46 to 1 by weight (as denoted in Table 1). Following the solvent incorporation, the remaining trim water was then added and allowed to mix for 30 minutes before EXAMPLE 4 was ready to be used in the coating processes described in the Examples below.

EXAMPLES 5-16 were made in an identical manner with the appropriate changes in the addition levels of the ingredients as detailed in Table 2.

TABLE 1

Formulation design with fixed High to Low Tg level (67:33) and varying Solvent to Polymer Ratio (0.46 to 0.0). Formulation design parameters include High to Low $T_g$ Polymer Ratios, Solids content, and Solvent to Polymer Ratio (n:1), and Formulation Percent Levels.

| Sprayable Coating Formulation | FORMULATION DESIGN | | | | FORMULATION % LEVELS | | |
|---|---|---|---|---|---|---|---|
| | HIGH TO LOW Tg RATIO | | TOTAL POLYMER SOLIDS | SOLVENT TO POLYMER RATIO (n:1) | EXAMPLE 1 Solids | EXAMPLE 2 Solids | 2-Butoxy ethanol % |
| | EXAMPLE 1 Ratio % | EXAMPLE 2 Ratio % | | | | | |
| EXAMPLE 4 | 67% | 33% | 20% | 0.46 | 13.4% | 6.6% | 9.2% |
| EXAMPLE 5 | 67% | 33% | 18% | 0.30 | 12.1% | 5.9% | 5.4% |
| EXAMPLE 6 | 67% | 33% | 20% | 0.13 | 13.4% | 6.6% | 2.6% |
| EXAMPLE 7 | 67% | 33% | 20% | 0.10 | 13.4% | 6.6% | 2.0% |
| EXAMPLE 8 | 67% | 33% | 20% | 0.07 | 13.4% | 6.6% | 1.4% |
| EXAMPLE 9 | 67% | 33% | 20% | 0.00 | 13.4% | 6.6% | 0.0% |

TABLE 3

Formulation Component Weights for sprayable coating formulations with varying Solvent to Polymer Ratio (0.46 to 0.0). Formulations contain 250 g polymer solids at 18 wt % or 20 wt % polymer solids.

FORMULATION WEIGHTS (250 g polymer solids)

| Sprayable Coating Formulation | EXAMPLE 1 (45 wt % solids) g | EXAMPLE 2 (45 wt % solids) g | 2-Butoxyethanol (neat) Wt g | Ammonium Hydroxide (28 wt % solids) Wt g | Trim Water g |
|---|---|---|---|---|---|
| EXAMPLE 4 | 372.2 | 183.3 | 115.0 | 7.0 | 572.4 |
| EXAMPLE 5 | 372.2 | 183.3 | 75.0 | 7.0 | 751.3 |
| EXAMPLE 6 | 372.2 | 183.3 | 32.5 | 7.0 | 654.9 |
| EXAMPLE 7 | 372.2 | 183.3 | 25.0 | 7.0 | 662.4 |
| EXAMPLE 8 | 372.2 | 183.3 | 17.5 | 7.0 | 669.9 |
| EXAMPLE 9 | 372.2 | 183.3 | 0.0 | 7.0 | 687.4 |

TABLE 2

Formulation design with varying fixed High to Low Tg levels (40:60 to 100:0) and Solvent to Polymer Ratio (primarily fixed at 0.1:1). Formulation design parameters include High to Low $T_g$ Polymer Ratios, Solids content, and Solvent to Polymer Ratio (n:1), and Formulation Percent Levels.

| Sprayable Coating Formulation | HIGH TO LOW Tg RATIO EXAMPLE 1 Ratio % | HIGH TO LOW Tg RATIO EXAMPLE 2 Ratio % | TOTAL POLYMER SOLIDS | SOLVENT TO POLYMER RATIO (n:1) | FORMULATION % LEVELS EXAMPLE 1 Solids | FORMULATION % LEVELS EXAMPLE 2 Solids | 2-Butoxy ethanol % |
|---|---|---|---|---|---|---|---|
| EXAMPLE 10 | 40% | 60% | 18% | 0.10 | 7.2% | 10.8% | 1.8% |
| EXAMPLE 11 | 50% | 50% | 18% | 0.10 | 9.0% | 9.0% | 1.8% |
| EXAMPLE 12 | 60% | 40% | 18% | 0.10 | 10.8% | 7.2% | 1.8% |
| EXAMPLE 7 | 67% | 33% | 18% | 0.10 | 12.1% | 5.9% | 1.8% |
| EXAMPLE 13 | 70% | 30% | 18% | 0.10 | 12.6% | 5.4% | 1.8% |
| EXAMPLE 14 | 73% | 27% | 18% | 0.10 | 13.1% | 4.9% | 1.8% |
| EXAMPLE 15 | 80% | 20% | 20% | 0.13 | 16.0% | 4.0% | 2.6% |
| EXAMPLE 16 | 100% | 0% | 20% | 0.46 | 20.0% | 0.0% | 9.2% |

TABLE 4

Formulation Component Weights for sprayable coating formulations with varying High to Low Tg levels (40:60 to 100:0) containing 250 g polymer solids at 18 wt % or 20 wt % polymer solids.

FORMULATION WEIGHTS (250 g polymer solids)

| Sprayable Coating Formulation | EXAMPLE 1 (45 wt % solids) g | EXAMPLE 2 (45 wt % solids) g | 2-Butoxyethanol (neat) Wt g | Ammonium Hydroxide (28 wt % solids) Wt g | Trim Water g |
|---|---|---|---|---|---|
| EXAMPLE 10 | 222.2 | 333.3 | 25.0 | 7.0 | 801.3 |
| EXAMPLE 11 | 277.8 | 277.8 | 25.0 | 7.0 | 801.3 |
| EXAMPLE 12 | 333.3 | 222.2 | 25.0 | 7.0 | 801.3 |
| EXAMPLE 7 | 372.2 | 183.3 | 25.0 | 7.0 | 801.3 |
| EXAMPLE 13 | 388.9 | 166.7 | 25.0 | 7.0 | 801.3 |
| EXAMPLE 14 | 405.6 | 150.0 | 25.0 | 7.0 | 801.3 |
| EXAMPLE 15 | 444.4 | 111.1 | 32.5 | 7.0 | 654.9 |
| EXAMPLE 16 | 555.6 | 0.0 | 115.0 | 7.0 | 572.4 |

Example 17—Comparative Example

As a comparative example, a coating formulation made in a manner very similar to Examples 4 to 16, except using a total latex polymer solids of 18 weight percent of the single pot emulsion according Example 3.

A sprayable formulation containing 250 g solid weight polymer was made in a 2,000-mL plastic beaker with a flat paddle mixer and a Model RZR 2041 Overhead Lab Mixer (Heidolph). Polymer latex emulsion of EXAMPLE 3, with a 45% solids content, was weighed into the aforementioned plastic beaker to a weight of 555.6 g on a laboratory balance (Mettler Toledo model XS6001S). The beaker was then placed under the mixer, with the blade in the polymer solution, and set to mix at 150 rpm. While the solution was mixing, two aliquots of trim water required for a dilution to 20% final solids was weighed into separate 500-mL plastic beakers; the required mass of water, 711.3 g, was split evenly between the two beakers. After being allowed to mix, one water aliquot was added to the mixing polymer solutions and allowed to mix for 2 minutes. While mixing, a Thermo Scientific Orion 5 Star Lab Meter with a Thermo Scientific Orion 9165 SureFlo pH probe and Thermo Scientific Orion 928007MD temperature probe was set up adjacent to the mixer set up. Prior to being used, the pH probe was calibrated using pH 4, 7, and 10 buffers from Fisher Scientific (SB101, SB107, and SB115 respectively). Once calibrated, the probes were then immersed in the mixing solution with care being taken to avoid any contact with the mixing blade. After the pH reading had stabilized, approximately 7 g of a saturated solution of ammonium hydroxide (28 wt %, Sigma-Aldrich 320145-2.5L) was then slowly added to the solution until a stable pH reading of 8 was reached. A 115-g quantity of 2-butoxyethanol (Sigma-Aldrich 537551) solvent was weighed into a 250-mL glass beaker. This provided for a Solvent to Polymer Ratio of 0.46 to 1 by weight. The solvent was slowly added to the mixture. Following the solvent incorporation, the remaining trim water was then added and allowed to mix for 30 minutes before EXAMPLE 17 was ready to be used in the coating processes described in the Examples below.

Example 18—Comparative Example

As a comparative example, a sprayable coating formulation made in a manner very similar to Examples 17 using the single pot emulsion of Example 3 and having a total latex polymer solids content of 18 weight percent, except a Solvent to Polymer Ratio of 0.1 to 1 by weight was used. After mixing 555.6 g of Example 3 with half of the required 801.3 g of trim water and adjusting to pH 8, 25 g 2-butoxyethanol (Sigma-Aldrich 537551) solvent was incorporated into the mixtures. The remaining trim water was then added and allowed to mix for 30 minutes before EXAMPLE 18 was ready to be used in the coating processes described in the Examples below.

Example 19

A sprayable coating formulation made in a manner very similar to Example 7 with a 67:33 ratio of High to Low Tg polymer was prepared, except the solvent selected was 1-methoxy-2-propanol (Sigma-Aldrich 484407). A sprayable formulation with total latex polymer solids content of 18 weight percent and a Solvent to Polymer Ratio of 0.1 to 1 by weight was created by combining 372.2 g Example 1, 183.3 g of Example 2, 801.3 g of trim water, adjustment to pH 8, with 25 g of added solvent 1-methoxy-2-propanol. The formulation was allowed to mix for 30 minutes before EXAMPLE 19 was ready to be used in the coating process described in the Examples below.

Example 20

A sprayable coating formulation made in a manner very similar to Example 7 with a 67:33 ratio of High to Low Tg polymer was prepared, except the solvent selected was 1-methyl-2-pyrrolidone (Sigma-Aldrich 328634). A sprayable formulation with total latex polymer solids content of 18 weight percent and a Solvent to Polymer Ratio of 0.1 to 1 by weight was created by 372.2 g Example 1, 183.3 g of Example 2, 801.3 g of trim water, adjustment to pH 8, and 25 g of added solvent 1-methyl-2-pyrrolidone (NMP). The formulation was allowed to mix for 30 minutes before EXAMPLE 20 was ready to be used in the coating process described in the Examples below.

Example 21-37

Coated particle were made by coating solid oxidizer particles with sprayable coating formulations according to EXAMPLES 4 to 20, respectively. For EXAMPLE 21, a 500-g sample of anhydrous crystalline Sodium Chlorate was obtained from AkzoNobel Pulp and Performance Chemicals, Marietta, Ga., USA and was sieved to fall between a size range of 425 microns to 850 microns. This material was loaded into a clean assembled Glatt GPCG-1 fluid bed coater (Glatt Air Techniques Inc., Ramsey, N.J.) equipped with a Wurster column and 0.5 mm nozzle with external mix air atomization. After establishing the fluidized bed of particles, the bed temperature was equilibrated at 35° C. and the sprayable formulation of EXAMPLE 4 was applied at a rate of approximately 500 g per hour using an atomization air pressure of 1 bar. After the 1190 g of the sprayable 18 weight percent polymer formulation was applied, which was approximately equivalent to a 30% coating weight application, the coating feed was turned off. An annealing process of final drying and solvent removal was achieved by maintaining air flow and ensuring the coated particles were continually fluidized while increasing the bed temperature in step-wise fashion from 35° C., to 50° C., to 70° C., and then to 93° C. The sample was held at each temperature for 15 minutes. Talc (available from Sigma-Aldrich #243604) was applied as a flow-aid as needed to prevent agglomerating during the annealing process. The particles were then observed under the microscope and by sieve analysis to confirm the presence of Cluster Particles compared to Individual Particles as noted in Table 5 below. A final annealing temperature was done in an external, convection oven at 130° C. for 15 minutes on a smaller subset of these particles, before Active Loss measurements after aging in water were determined as described below. For Examples 22 to 37 in Table 5 and Table 6, a similar coating process was followed where the particle was coated with its corresponding sprayable formulation. A review of FIG. 1 reveals that the coated particles made according to Examples 28 and 29 were clustered, while the coated particles made according to Examples 24 and 32 were individual particles. In Examples 34 and 35, the resulting particle coating was made using the single pot polymer from Example 3. A review of FIG. 2 reveals that the coated particles made according to Example 34 were a solid mass, while the coated particles made according to Example 35 were individual particles. In Example 35, the polymer coating was applied together with the coalescence solvent 1-methoxy-2-propanol, referred to as MP in Table 6 below. In Example 36, the polymer coating was applied together with the coalescence solvent 1-methyl-2-pyrrolidone, referred to as NMP in Table 6 below.

A test of the protection of release of sodium chlorate active through the polymer coating was also carried out for Examples 21 to 37, as follows: a fixed weight of each Example tested was placed in deionized water and allowed to soak for 1 hour in water at 71° C., the Active Release was calculated, and the results are shown in Table 5 and Table 6. A solution that contained 1.05 g of the sodium chlorate active together with 48.95 g deionized water was made for each Example. This was the achieved by dosing 3 wt % of an encapsulated particle with a 30% coating into 97 wt % deionized water for an effective 2.1% active loading. The conductivity of each Example was measured before heating to confirm that encapsulation was achieved as witnessed by low electrical conductivity. The samples were then placed in an oven at 71° C. for 60 minutes. Once this time had expired, the samples were removed from the oven and conductivity was measured again. The electrical conductivity of all solutions was measured with a Thermo Scientific Orion 5 Star Lab Meter and an Orion 013010MD Conductivity Cell. The electrical conductivity of the various sodium chlorate solutions was shown to vary linearly with active concentration. The effect of the coating polymer itself on conductivity was found to be negligible. Once conductivities were measured, the Active Release could be quantified from 0% to 100%. The Active Release as shown in Table 5 was the quotient of the conductivity of the aqueous solution containing coated particles and the conductivity a solution containing 2.1 wt % of uncoated sodium chlorate. As an example, for EXAMPLE 24, the conductivity of the heated solution was 24 µS/cm. The conductivity of a control sample containing 2.1 wt % sodium chlorate active dissolved in DI water was found to be 17,500 µS/cm. Thereby, EXAMPLE 24 had a release of 0.1% active or the quotient of 24 µS/cm and 17500 µS/cm. This technique was repeated on all examples 21-37 as shown in Table 5 and Table 6.

TABLE 5

Coated Particle summary data for EXAMPLES 20-25 for particles coated with sprayable formulation containing varying Solvent to Polymer Ratio (n:1) of 0.46 to 0.0.

| COATED PARTICLE | SPRAYABLE FORMU-LATION | High Tg to Low Tg Ratio | Solvent to Polymer Ratio (n:1) | Morphology | Active Release after 1 hour at 70 C. |
|---|---|---|---|---|---|
| EXAMPLE 21 | EXAMPLE 4 | 67:33 | 0.46 | Heavy Cluster | 0.2% |
| EXAMPLE 22 | EXAMPLE 5 | 67:33 | 0.30 | Clustered | 0.1% |
| EXAMPLE 23 | EXAMPLE 6 | 67:33 | 0.13 | Individual | 0.2% |
| EXAMPLE 24 | EXAMPLE 7 | 67:33 | 0.10 | Individual | 0.1% |
| EXAMPLE 25 | EXAMPLE 8 | 67:33 | 0.07 | Individual | 2.2% |
| EXAMPLE 26 | EXAMPLE 9 | 67:33 | 0.00 | Individual | 9.4% |

TABLE 6

Coated Particle summary data for EXAMPLES 26-35 for particles coated with sprayable formulation containing varying Solvent to Polymer Ratio (n:1) of 0.46 to 0.0.

| COATED PARTICLE | SPRAYABLE FORMULATION | High Tg to Low Tg Ratio | Solvent to Polymer Ratio (n:1) | Morphology | Active Release after 1 hour at 70 C. |
|---|---|---|---|---|---|
| Ex. 27 | EXAMPLE 10 | 40:60 | 0.10 | Clustered | 0.2% |
| Ex. 28 | EXAMPLE 11 | 50:50 | 0.10 | Clustered | 1.0% |
| Ex. 29 | EXAMPLE 12 | 60:40 | 0.10 | Clustered | 0.9% |
| Ex. 24 | EXAMPLE 7 | 67:33 | 0.10 | Individual | 0.1% |
| Ex. 30 | EXAMPLE 13 | 70:30 | 0.10 | Individual | 0.2% |
| Ex. 31 | EXAMPLE 14 | 73:27 | 0.10 | Individual | 0.2% |
| Ex. 32 | EXAMPLE 15 | 80:20 | 0.13 | Individual | 9% |
| Ex. 33 | EXAMPLE 16 | 100:0 | 0.46 | Individual | 18% |
| Ex. 34 | EXAMPLE 17 | Single Resin Tg | 0.46 | Solid Mass | 4% |
| Ex. 35 | EXAMPLE 18 | Single Resin Tg | 0.10 | Individual | 10% |
| Ex. 36 | EXAMPLE 19 | 67:33 with MP | 0.10 | Individual | 0.2% |
| Ex. 37 | EXAMPLE 20 | 67:33 with NMP | 0.10 | Individual | 0.1% |

Desirable performance was assessed by the combined performance versus two key criteria: 1) the ability to create individual particles and 2) the release of active after 1 hour at 70° C. of less than around 2.2%. A review of the Tables reveals that very good combined performance was achieved for formulations with a Solvent to Polymer Ratio (n:1) of 0.3 to 0.07, with a fixed High to Low Tg ratio of 67:33. The most preferred Solvent to Polymer Ratio was approximately 0.13 to 0.1. Examples 21, 22, 27, 28, 29, and 34 serve as Comparative Examples. At higher Solvent to Polymer Ratio greater than 0.3, the Examples produced either a solid mass of agglomerated particles, heavily clustered particles, or clustered particles as noted in Table 5 and Table 6. At lower (less than 0.07) Solvent to Polymer Ratios, a higher release of active was seen.

While holding the Solvent to Polymer Ratio constant at 0.1, the ratio of High to Low Tg polymer was found to have the lowest release of active (less than 5% active) while maintaining individual particles for ratios of 60:40 to 73:27. Again, the lowest release was found at 67:33 high to low Tg polymer at the relative solvent level of 13% where the active release was 0.09%. Examples 26, 32, 33, 34, 35, and 36 serve as Comparative Examples, which do not offer appreciable protection of the active from dissolving in water as shown by active release amounts from 4% to 18% as noted in Table 5 and Table 6.

What is claimed is:

1. A controlled release composition comprising an active water-soluble material in the form of granules having a protective barrier coating capable of releasing the active water-soluble material in an aqueous environment, wherein release of the active water-soluble material after 1 hour at 70° C. is less than 2.2% by weight, said protective barrier coating comprising a polymer blend of two latex polymers, said blend comprising 60 to 80 wt % high glass-transition temperature (Tg) latex polymer and 20 to 40 wt % low Tg latex polymer, wherein the high Tg latex polymer has a Tg at least 20° C. higher than the Tg of the low Tg latex polymer, whereby a Tg is determined by heating from a temperature of −40° C. at a rate of 3° C./min with a superimposed sine oscillating temperature of +/−1° C. with a period of 1 min.

2. The composition according to claim 1, wherein the high Tg latex polymer has a Tg at least 40° C. higher than the Tg of the low Tg latex polymer.

3. The composition according to claim 1, wherein the high Tg latex polymer is a styrene-acrylate copolymer.

4. The composition according to claim 3, wherein the high Tg styrene-acrylate polymer is a polymerized combination of monomers comprising styrene and ethyl acrylate monomers having a styrene content in the range of 52 to 63 wt % and ethyl acrylate content in the range of 9 to 13 wt %, and from 10 to 15 wt % of at least one cross-linker monomer, up to a total of 100 wt %.

5. The composition according to claim 4, wherein the at least one cross-linker monomer is a combination of glycidyl methacrylate and methacylic acid.

6. The composition according to claim 3, wherein the high Tg styrene-acrylate polymer has a Tg of 80° C. or higher.

7. The composition according to claim 1, wherein the low Tg styrene-acrylate polymer is a polymerized combination of monomers comprising styrene and ethyl acrylate monomers having a styrene content in the range of 9 to 13 wt % and ethyl acrylate content in the range of 70 to 76 wt %, and from 10 to 15 wt % of at least one cross-linker monomer, up to a total of 100 wt %.

8. The composition according to claim 7, wherein the low Tg styrene-acrylate polymer has a Tg of 40° C. or lower.

9. A method for breaking an aqueous fracturing fluid, said method comprising introducing into a subterranean formation a controlled release breaker composition comprising a breaker for the aqueous fracturing fluid in the form of granules with a barrier coating according to claim 1, and wherein the release conditions are the exposure to the fracturing fluid that results in osmotic rupturing of the barrier coating, or subjecting said controlled release breaker composition to high shear or crush forces sufficient to rupture the barrier coating, wherein the high Tg latex polymer preferably has a Tg at least 40° C. higher than the Tg of the low Tg latex polymer.

10. A method according to claim 9, wherein the granules of the breaker are oxidizer breakers which are released in an amount of less than 10 wt % of said breaker after exposure to water for 1 hour at 70° C., when the granules have a 22 wt % coating, based on the total weight of the granule.

11. A sprayable coating formulation comprising water and a polymer blend of two latex polymers, said blend comprising 60 to 80 wt % high glass-transition temperature (Tgl latex polymer and 20 to 40 wt % low Tg latex polymer, wherein the high Tg latex polymer has a Tg at least 40° C. higher than the Tg of the low Tg latex polymer, wherein both latex polymers have a gel content of 50% or greater, wherein the sprayable formulation has a polymer solids content in the range of 10 to 40 wt %, and wherein the sprayable formulation further contains an organic solvent having a boiling point in the range from 110° C. to 225° C. and the weight ratio of solvent to polymer solids is in the range from 0.5:1 to 0.1:1.

12. A method of coating a water-soluble material in the form of granules with a sprayable formulation according to claim 11 in a particle coating apparatus, said method comprising: (1) introducing the water-soluble material in the form of granules into the particle coating apparatus; (2) introducing the sprayable formulation into the particle coating apparatus and maintaining conditions sufficient for a barrier coating to build up on the water-soluble material and form coated particles, and to remove water from the apparatus until the coated particles contain a predetermined amount of barrier coating and the barrier coating is substantially free of water; and (3) subjecting the coated particles to conditions sufficient to anneal the barrier coating and substantially remove the organic solvent from the barrier coating.

13. A method according to claim 12, wherein step (2) is carried out at an initial temperature below 50° C. and step (3) is carried out at a temperature at or above 100° C.

* * * * *

UNITED STATES PATENT AND TRADEMARK OFFICE
CERTIFICATE OF CORRECTION

PATENT NO. : 10,017,685 B2
APPLICATION NO. : 15/327486
DATED : July 10, 2018
INVENTOR(S) : Ferm et al.

Page 1 of 1

It is certified that error appears in the above-identified patent and that said Letters Patent is hereby corrected as shown below:

In the Claims

Column 22, Line 25:
Delete "(Tgl"
Insert --(Tg)--

Signed and Sealed this
Twenty-seventh Day of November, 2018

Andrei Iancu
*Director of the United States Patent and Trademark Office*